Oct. 9, 1962 E. G. SMITH 3,057,216
BELT DRIVEN CHANGE SPEED GEARS
Filed April 29, 1959 2 Sheets-Sheet 2

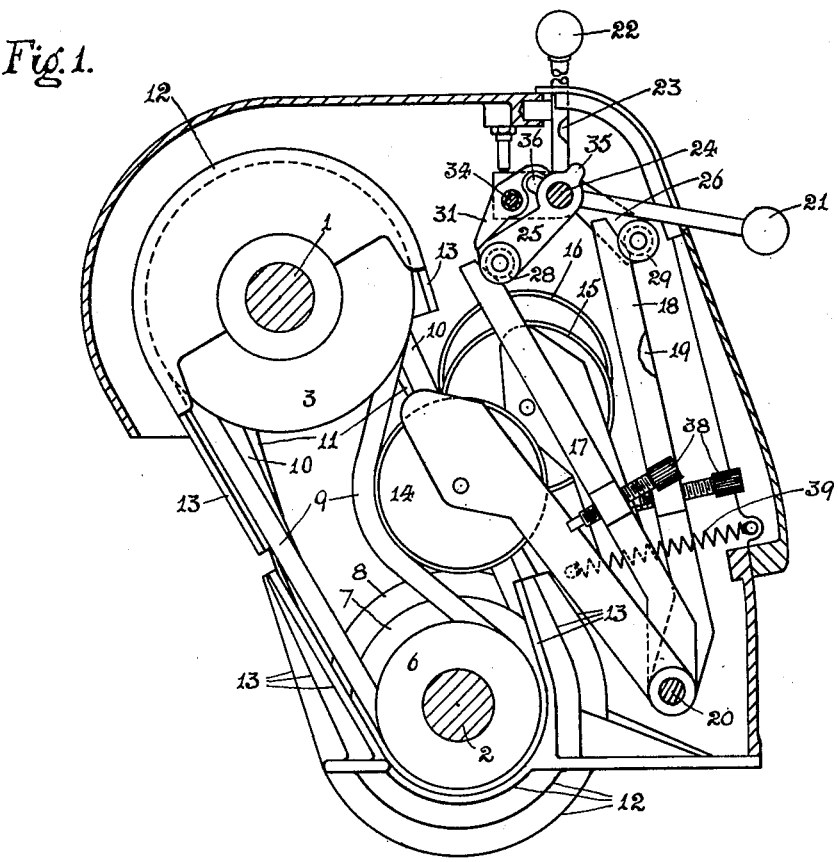
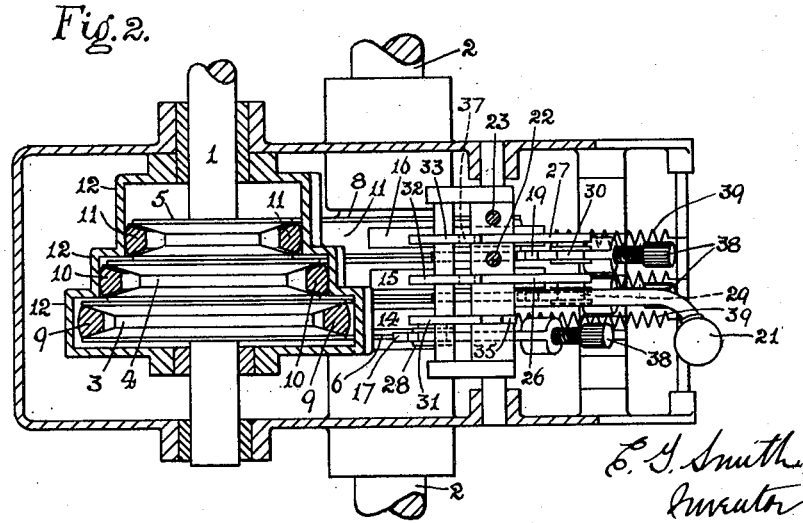

E. G. Smith
Inventor
by Mason, Porter, Diller & Stewart
Attorneys

United States Patent Office 3,057,216
Patented Oct. 9, 1962

3,057,216
BELT DRIVEN CHANGE SPEED GEARS
Ernest G. Smith, Cromer, England, assignor to Myford Engineering Company Limited, Beeston, England
Filed Apr. 29, 1959, Ser. No. 809,722
5 Claims. (Cl. 74—217)

This invention relates to improvements in belt driven change speed gears in which a driven shaft is connected to a driving shaft by any selected one of a series of belts associated with driving and driven pulleys on the two shafts and its object is to provide a construction in which any belt can be brought into operation by the movement of a lever associated with the belt, the movement of the lever also disengaging any other belt then in operation. The construction also obviates any friction between the inoperative belts and their associated pulleys.

According to this invention the change speed gear comprises a driving and a driven shaft, a plurality of pairs of driving and driven pulleys, a pulley of each pair secured on the respective shafts, a belt for each pair of pulleys normally held clear of the pulleys by guides engaging with the outer side of the belts and a jockey pulley to engage with the outer side of each belt when desired to displace the belt to provide a driving connection between the two shafts. The jockey pulleys are moved by control levers and the operation of any one control lever to bring its associated belt into operation is adapted to release any other belt then in operation so that two belts cannot be put into operation at the same time.

The invention will now be more particularly described with reference to the accompanying drawings in which:

FIG. 1 is a side elevation,

FIG. 2, a plan partly in section and

Figure 3:
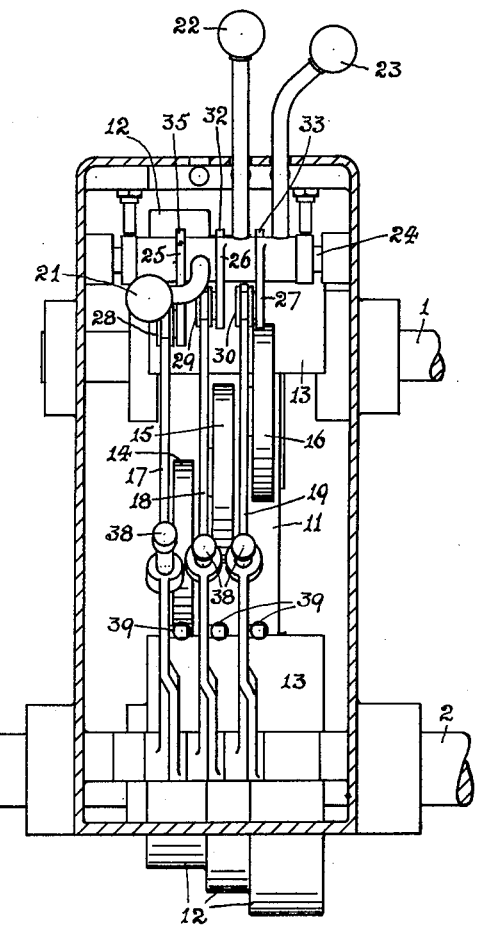

FIG. 3, a front elevation of a belt driven change speed gear constructed according to this invention.

Figure 4:
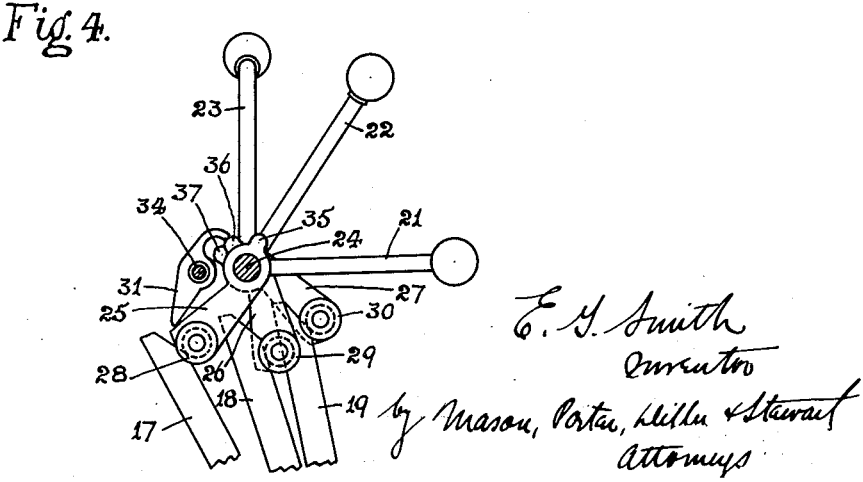

FIG. 4 is a side elevation of the lever operating mechanism showing how the movement of one lever into its operative position disengaged any other lever from its operative position.

Like numerals indicate like parts throughout the drawings.

In carrying out this invention a driving shaft 1 and a driven shaft 2 are provided. The driving shaft 1 has a plurality of pulleys secured thereto and preferably suitable for use with a V type belt. A similar number of pulleys are secured to the driven shaft 2. For example, three pulleys may be mounted on each shaft and are arranged in pairs, that is one pulley on each shaft forming a pair and they are of such a size that each pair provides a different speed to the driven shaft. A belt is provided in association with each pair of pulleys and the centres of the shafts are spaced apart such a distance that the belts are slack and normally do not provide a driving connection between their associated pulleys.

In the arrangement shown in the drawings the driving shaft 1 has three V pulleys 3, 4 and 5 secured thereon and the driven shaft 2 has three V pulleys 6, 7 and 8 secured thereon, making three pairs of pulleys which are connected together by belts 9, 10 and 11. As shown in the drawings the belt 9 is in operation and providing a driving connection between the pulleys 3 and 6. The belts 10 and 11 are out of action and are held clear of their pulleys as hereinafter explained.

In order to prevent the belts 9, 10 and 11 rubbing on their respective pulleys when they are not in use, each pulley is provided with a substantially semi-circular guide 12. The guides 12 are disposed on the sides of the pulleys remote from each other. The ends of the guides are formed with extensions 13 which extend towards each other. The guides are disposed a short distance away from the pulleys as shown in FIGS. 1 and 2 and when the belts are placed on the pulleys their natural tendency to assume a circular formation when free to do so causes them to engage with the inner side of the guides 12 and their extensions 13 in which position they are held clear of the pulleys. As shown in FIG. 2 the belts 10 and 11 are held clear of the pulleys 4, 5 at their upper ends and their lower ends are similarly held clear of the pulleys 7, 8.

In order to establish a driving connection between any required pair of pulleys the slack in the belt is taken up by a jockey pulley which is moved into engagement with the outer side of the belt, between the shafts 1, 2 and moves the belt towards its opposite run a sufficient distance to take up the slack in the belt and provide a driving connection between the driving and driven pulley. A jockey pulley is provided for each belt and each jockey pulley is carried by a pivoted arm which is moved about its pivot by a control lever to move the jockey pulley into its operative position. Jockey pulleys 14, 15 and 16 are provided, one for each belt and these jockey pulleys are respectively carried by pivoted arms 17, 18 and 19 which are pivoted at 20 and are moved about their pivot to move the jockey pulleys to take up the slack in the respective belts. The arms, 17, 18 and 19 are moved into their operative positions by control levers 21, 22 and 23. For this purpose the control levers 21, 22 and 23 are pivoted on a shaft 24 and the control levers are provided with tails 25, 26 and 27 which carry antifriction rollers 28, 29 and 30 which ride on the respective arms 17, 18 and 19. When the control levers are moved into their operative positions the rollers move along the arms and move them about their pivots into their operative positions. When the control levers are in their operative positions the tails move over the dead centre as shown by control lever 21 and tail 25 in FIG. 1 so that the arms are held in their operative positions until released.

In order to prevent more than one of the arms 17, 18, 19 being moved into its operative position at the same time trip levers 31, 32, 33 are provided in association with the control levers. The trip levers are secured on a shaft 34 and abutments 35, 36, 37 are provided on the respective bosses of the control levers or on the tails 25, 26, 27. The trip levers have one end which engages with the tail of its associated control lever when the control lever is in its operative position so that when one of the other control levers is moved towards an operative position the abutment on the boss of this control lever first engages its trip lever as shown in FIG. 4 and rocks the latter and consequently the other trip levers so that the tail of any control lever in an operative position is engaged by its trip lever and moved thereby to a position which releases its associated belt before the control lever being operated reaches its operative position.

It will be understood that when a control lever is put out of action by the trip levers the initial motion imparted by the trip levers moves the tail of the control lever across the dead centre and the control lever and the arm associated therewith carrying the jockey pulley are then returned to their inoperative positions by the pressure exerted on the jockey pulley by its belt. The trip levers also act as stops for the control levers and arrest their movement when they reach their operative positions.

Provision is preferably made to adjust the working tension of the belts. For this purpose the arms which carry the jockey pulleys are made in two parts which are adjusted relatively to each other by screws 38 which are mounted in one part and have their ends engaging the other part and held in engagement therewith by springs 39.

The change speed gear described is simple in construction and operation and a change from one speed to an-

What I claim is:

1. A belt driven change speed drive having in combination a driving and driven shaft, a plurality of pairs of driving and driven pulleys, a pulley of each pair secured on the respective shafts, a belt for each pair of pulleys, guides which engage with the outer sides of the belts and normally hold the belts clear of the pulleys, a jockey pulley engaging with the outer side of each belt, a pivoted arm to carry each jockey pulley, control means for each arm to move a selected arm from a normal position and hold it in a belt displacing position and provide a driving connection between the two shafts, springs to return the arms to their normal positions when released and means actuated by each arm control means to release an arm from its belt displacing position as another arm is moved towards its belt displacing position, the arm control means comprising control levers, tails on the control levers, rollers on the tails engaging the arms, trip levers to arrest the tails in an arm holding position and abutments associated with the control levers disposed so that the initial movement of any control lever from its normal position moves the trip levers and moves any tail then in arm holding position back towards its normal position.

2. A belt driven change speed drive according to claim 1 in which the abutments to move the trip levers are disposed on the tails.

3. In a belt driven change speed drive of the type having a plurality of pairs of pulleys connected by belts, a jockey pulley for each belt, a pivoted arm carrying each jockey pulley, a control lever for each arm movable about a pivot, a connection between each control lever and its associated arm, a stop lever for each control lever to arrest the latter in an arm locking position, a shaft, said stop levers being secured on said shaft, an abutment on each control lever engaging with its associated stop lever when a control lever is moved towards its operative position to turn all the stop levers on said shaft and move any control lever in arm locking position away therefrom to release its arm.

4. In a belt driven change speed drive of the type having a plurality of pairs of pulleys connected by belts, a jockey pulley for each belt, an arm for each jockey pulley, each arm including a pivoted first arm part carrying each jockey pulley and a second arm part pivoted coaxial with each first arm part, screw means for adjusting the relative positions of the two arm parts of each arm, a spring to move each first arm part away from its belt, a control lever for each jockey pulley movable about a pivot, a roller on the control lever riding on the respective second arm part, a stop lever for each control lever to arrest the control lever in an arm locking position with its associated jockey pulley in belt tensioning position, a shaft above the control levers, said stop levers being secured on said shaft, abutments on the control levers disposed under one end of their associated stop levers when the control levers are in their inoperative positions and adapted to turn all the stop levers when any control lever is moved away from its inoperative position to disengage any control lever in its operative position.

5. In a belt driven change speed drive of the type including a plurality of belts selectively tensioned by a like number of jockey pulleys mounted on spring returned pivotally mounted arms; control means for assuring the tensioning of one belt only at a time, said control means comprising a first shaft, a control lever for each jockey pulley pivoted on said first shaft and having means for moving said arms to belt tensioning positions, a second shaft parallel to and adjacent to said first shaft, a stop lever for each control lever mounted on said second shaft for pivoting in unison in response to pivoting of one stop lever, abutments on the control levers disposed under one end of their associated stop levers when the control levers are in their inoperative positions and adapted to turn all the stop levers when any control lever is moved away from its inoperative position to disengage any control lever in its operative position.

References Cited in the file of this patent

UNITED STATES PATENTS

| 320,687 | Price | June 23, 1885 |
| 622,329 | Crafts | Apr. 4, 1899 |
| 881,086 | Stevens | Mar. 3, 1908 |
| 2,100,889 | Wickman | Nov. 30, 1937 |
| 2,419,850 | Norton | Apr. 28, 1947 |
| 2,862,569 | Strunk | Dec. 2, 1958 |
| 2,995,944 | Ciaccio | Aug. 15, 1961 |
| 3,002,395 | Kaytor | Oct. 31, 1961 |

FOREIGN PATENTS

| 138,912 | Great Britain | Mar. 10, 1921 |